(12) United States Patent
Murray et al.

(10) Patent No.: US 9,141,404 B2
(45) Date of Patent: Sep. 22, 2015

(54) EXTENSIBLE FRAMEWORK FOR EREADER TOOLS

(75) Inventors: Abraham Murray, Scituate, MA (US); Tania Bedrax-Weiss, Sunnyvale, CA (US); Frank R. Worsley, San Francisco, CA (US); Gopal Venu Vemula, San Ramon, CA (US); C. J. Scott Dougall, Burbank, CA (US); Nemanja L. Spasojevic, San Francisco, CA (US)

(73) Assignee: Google Inc., Mountain View, CA (US)

( * ) Notice: Subject to any disclaimer, the term of this patent is extended or adjusted under 35 U.S.C. 154(b) by 51 days.

(21) Appl. No.: 13/280,197

(22) Filed: Oct. 24, 2011

(65) Prior Publication Data

US 2013/0104028 A1  Apr. 25, 2013

(51) Int. Cl.
| | |
|---|---|
| *G06F 17/24* | (2006.01) |
| *G06F 9/44* | (2006.01) |
| *G06F 15/02* | (2006.01) |
| *G06F 9/445* | (2006.01) |
| *G06F 17/25* | (2006.01) |

(52) U.S. Cl.
CPC ............ *G06F 9/4443* (2013.01); *G06F 9/4451* (2013.01); *G06F 15/0291* (2013.01)

(58) Field of Classification Search
CPC .............................. G06F 17/218; G06F 17/211
USPC .................................................. 715/234, 230
See application file for complete search history.

(56) References Cited

U.S. PATENT DOCUMENTS

| | | | |
|---|---|---|---|
| 4,820,167 | A | 4/1989 | Nobles et al. |
| 4,985,697 | A | 1/1991 | Boulton |
| 5,392,387 | A | 2/1995 | Fitzpatrick et al. |
| 5,463,725 | A | 10/1995 | Henckel et al. |
| 5,877,765 | A | 3/1999 | Dickman et al. |
| 5,893,132 | A | 4/1999 | Huffman et al. |
| 6,122,647 | A | 9/2000 | Horowitz et al. |
| 6,178,431 | B1 | 1/2001 | Douglas |
| 6,181,344 | B1 | 1/2001 | Tarpenning et al. |
| 6,340,967 | B1 | 1/2002 | Maxted |
| 6,438,564 | B1 | 8/2002 | Morton et al. |

(Continued)

FOREIGN PATENT DOCUMENTS

| | | |
|---|---|---|
| EP | 1205898 A2 | 5/2002 |
| EP | 2104026 A2 | 9/2009 |

(Continued)

OTHER PUBLICATIONS

Fenwick et al., "Teaching Mobile Computing and Developing Software to Support Computer Science Education", ACM, 2011, pp. 589-594.*

(Continued)

*Primary Examiner* — James J Debrow

(74) *Attorney, Agent, or Firm* — Fenwick & West LLP

(57) ABSTRACT

The functionality of an ereader module that is displaying an electronic book ("ebook") is extended. A user identifier specifying a user using a client device executing the ereader module and an ebook identifier specifying the ebook displayed by the ereader module are received from the client device. One or more layers associated with the user are determined. One or more layers associated with the ebook are determined. A list of one or more layers is assembled. The layer list is transmitted to the client device. The client device enables the user to select a layer and use the selected layer to interact with content of the ebook.

20 Claims, 5 Drawing Sheets

(56) References Cited

U.S. PATENT DOCUMENTS

| | | | |
|---|---|---|---|
| 6,590,568 B1 | 7/2003 | Astala et al. | |
| 6,611,840 B1 | 8/2003 | Baer et al. | |
| 6,704,733 B2 | 3/2004 | Clark et al. | |
| 6,907,407 B1 | 6/2005 | Yamanoue et al. | |
| 6,957,233 B1 | 10/2005 | Beezer et al. | |
| 6,980,652 B1 | 12/2005 | Braitberg et al. | |
| 7,007,034 B1 | 2/2006 | Hartman et al. | |
| 7,020,654 B1 | 3/2006 | Najmi | |
| 7,058,902 B2 | 6/2006 | Iwema et al. | |
| 7,139,977 B1 | 11/2006 | Russell | |
| 7,210,107 B2 | 4/2007 | Wecker et al. | |
| 7,236,966 B1 | 6/2007 | Jackson et al. | |
| 7,270,546 B1 | 9/2007 | Adams et al. | |
| 7,496,856 B2 | 2/2009 | Beezer et al. | |
| 7,545,940 B2 | 6/2009 | Alessi et al. | |
| 7,546,524 B1 | 6/2009 | Bryar et al. | |
| 7,748,634 B1 | 7/2010 | Zehr et al. | |
| 7,779,347 B2 | 8/2010 | Christiansen et al. | |
| 7,793,233 B1 | 9/2010 | Sellers et al. | |
| 7,873,588 B2 | 1/2011 | Sareday et al. | |
| 8,131,647 B2 | 3/2012 | Siegel et al. | |
| 8,239,574 B2 | 8/2012 | Keum et al. | |
| 8,245,156 B2 | 8/2012 | Mouilleseaux et al. | |
| 8,352,449 B1 | 1/2013 | Parekh et al. | |
| 8,433,431 B1 | 4/2013 | Master et al. | |
| 8,478,662 B1 | 7/2013 | Snodgrass et al. | |
| 8,504,369 B1 | 8/2013 | Chigier et al. | |
| 8,504,906 B1 | 8/2013 | Xu | |
| 8,527,859 B2 | 9/2013 | Henshall et al. | |
| 8,706,685 B1 | 4/2014 | Smith et al. | |
| 8,799,765 B1 | 8/2014 | MacInnis et al. | |
| 2002/0054073 A1 | 5/2002 | Yuen | |
| 2002/0073177 A1 | 6/2002 | Clark et al. | |
| 2002/0082939 A1 | 6/2002 | Clark et al. | |
| 2002/0087560 A1 | 7/2002 | Bardwell | |
| 2002/0091793 A1 | 7/2002 | Sagie | |
| 2002/0099552 A1 | 7/2002 | Rubin et al. | |
| 2002/0120635 A1 | 8/2002 | Joao | |
| 2002/0184189 A1 | 12/2002 | Hay et al. | |
| 2003/0013073 A1 | 1/2003 | Duncan et al. | |
| 2003/0020687 A1 | 1/2003 | Sowden et al. | |
| 2003/0206189 A1 | 11/2003 | Demello et al. | |
| 2004/0109026 A1 | 6/2004 | Kessenich et al. | |
| 2004/0162846 A1* | 8/2004 | Nakahara et al. | 707/102 |
| 2004/0175095 A1 | 9/2004 | Freeman | |
| 2004/0201633 A1 | 10/2004 | Barsness et al. | |
| 2004/0205568 A1 | 10/2004 | Breuel et al. | |
| 2004/0267527 A1 | 12/2004 | Creamer et al. | |
| 2005/0022113 A1 | 1/2005 | Hanlon | |
| 2005/0089835 A1 | 4/2005 | Soldavini et al. | |
| 2005/0097007 A1 | 5/2005 | Alger et al. | |
| 2005/0132281 A1 | 6/2005 | Pan et al. | |
| 2005/0154760 A1* | 7/2005 | Bhakta et al. | 707/104.1 |
| 2005/0193330 A1* | 9/2005 | Peters | 715/513 |
| 2006/0053364 A1 | 3/2006 | Hollander et al. | |
| 2006/0085767 A1 | 4/2006 | Hinckley et al. | |
| 2006/0114757 A1 | 6/2006 | Theimer et al. | |
| 2006/0182345 A1 | 8/2006 | Geidl | |
| 2006/0194181 A1 | 8/2006 | Rosenberg | |
| 2006/0282778 A1 | 12/2006 | Barsness et al. | |
| 2007/0055926 A1 | 3/2007 | Christiansen et al. | |
| 2007/0080500 A1 | 4/2007 | Kano | |
| 2007/0083906 A1* | 4/2007 | Welingkar | 725/110 |
| 2007/0118794 A1 | 5/2007 | Hollander et al. | |
| 2007/0136657 A1 | 6/2007 | Blumenthal et al. | |
| 2007/0150801 A1 | 6/2007 | Chidlovskii et al. | |
| 2007/0180392 A1 | 8/2007 | Russo | |
| 2007/0300260 A1 | 12/2007 | Holm et al. | |
| 2008/0027726 A1 | 1/2008 | Hansen et al. | |
| 2008/0066185 A1* | 3/2008 | Lester et al. | 726/27 |
| 2008/0141182 A1* | 6/2008 | Barsness et al. | 715/864 |
| 2008/0168073 A1 | 7/2008 | Siegel et al. | |
| 2008/0189328 A1 | 8/2008 | Sareday et al. | |
| 2008/0222257 A1 | 9/2008 | Mukherjee et al. | |
| 2008/0222552 A1 | 9/2008 | Batarseh et al. | |
| 2008/0229182 A1 | 9/2008 | Hendricks et al. | |
| 2008/0229190 A1* | 9/2008 | Johnson | 715/238 |
| 2008/0231610 A1 | 9/2008 | Hotelling et al. | |
| 2008/0243991 A1 | 10/2008 | Ryan et al. | |
| 2008/0293450 A1 | 11/2008 | Ryan et al. | |
| 2008/0294674 A1 | 11/2008 | Reztlaff et al. | |
| 2008/0317346 A1 | 12/2008 | Taub | |
| 2008/0320579 A1 | 12/2008 | Rollins et al. | |
| 2009/0047647 A1 | 2/2009 | Welch | |
| 2009/0049077 A1 | 2/2009 | Lawlor | |
| 2009/0063157 A1 | 3/2009 | Seo | |
| 2009/0125413 A1 | 5/2009 | Le Chevalier et al. | |
| 2009/0187842 A1 | 7/2009 | Collins et al. | |
| 2009/0254802 A1 | 10/2009 | Campagna et al. | |
| 2009/0267909 A1 | 10/2009 | Chen et al. | |
| 2009/0287604 A1 | 11/2009 | Korgav et al. | |
| 2009/0300539 A1 | 12/2009 | Hendricks | |
| 2010/0017701 A1 | 1/2010 | Bargeron et al. | |
| 2010/0050064 A1 | 2/2010 | Liu et al. | |
| 2010/0088746 A1* | 4/2010 | Kota et al. | 726/3 |
| 2010/0161653 A1 | 6/2010 | Krasnow | |
| 2010/0185932 A1 | 7/2010 | Coffman et al. | |
| 2010/0214216 A1 | 8/2010 | Nasiri et al. | |
| 2010/0262659 A1 | 10/2010 | Christiansen et al. | |
| 2010/0274864 A1 | 10/2010 | Jalili | |
| 2010/0278453 A1 | 11/2010 | King | |
| 2010/0315359 A1 | 12/2010 | Seong et al. | |
| 2010/0324709 A1 | 12/2010 | Starmen | |
| 2010/0324895 A1 | 12/2010 | Kurzweil et al. | |
| 2011/0010210 A1 | 1/2011 | Alcorn et al. | |
| 2011/0029435 A1* | 2/2011 | Ronen et al. | 705/53 |
| 2011/0050591 A1 | 3/2011 | Kim et al. | |
| 2011/0050594 A1 | 3/2011 | Kim et al. | |
| 2011/0055760 A1 | 3/2011 | Drayton et al. | |
| 2011/0087955 A1 | 4/2011 | Ho et al. | |
| 2011/0106970 A1 | 5/2011 | Song et al. | |
| 2011/0153047 A1 | 6/2011 | Cameron et al. | |
| 2011/0153330 A1 | 6/2011 | Yazdani et al. | |
| 2011/0163944 A1 | 7/2011 | Bilbrey et al. | |
| 2011/0167350 A1 | 7/2011 | Hoellwarth | |
| 2011/0177481 A1 | 7/2011 | Haff et al. | |
| 2011/0184960 A1 | 7/2011 | Delpha et al. | |
| 2011/0195388 A1 | 8/2011 | Henshall et al. | |
| 2011/0202606 A1 | 8/2011 | Agarwal et al. | |
| 2011/0208614 A1 | 8/2011 | Tom | |
| 2011/0227949 A1* | 9/2011 | Kung et al. | 345/660 |
| 2011/0231474 A1 | 9/2011 | Locker et al. | |
| 2011/0246502 A1 | 10/2011 | Aguera Y Arcas et al. | |
| 2011/0252415 A1* | 10/2011 | Ricci | 717/173 |
| 2011/0261030 A1* | 10/2011 | Bullock | 345/204 |
| 2011/0276863 A1 | 11/2011 | Bhise et al. | |
| 2011/0314427 A1 | 12/2011 | Sundararajan | |
| 2012/0001844 A1 | 1/2012 | Auguste et al. | |
| 2012/0019400 A1 | 1/2012 | Patel et al. | |
| 2012/0030022 A1 | 2/2012 | Ajima | |
| 2012/0046947 A1 | 2/2012 | Fleizach | |
| 2012/0047455 A1 | 2/2012 | Yuan et al. | |
| 2012/0066581 A1* | 3/2012 | Spalink | 715/232 |
| 2012/0077175 A1 | 3/2012 | Levisay et al. | |
| 2012/0096094 A1* | 4/2012 | So et al. | 709/206 |
| 2012/0102395 A1 | 4/2012 | Cho et al. | |
| 2012/0110429 A1 | 5/2012 | Tzonis et al. | |
| 2012/0113019 A1 | 5/2012 | Anderson | |
| 2012/0147055 A1 | 6/2012 | Pallakoff et al. | |
| 2012/0151397 A1 | 6/2012 | Oberstein et al. | |
| 2012/0200573 A1 | 8/2012 | Stoner et al. | |
| 2012/0204092 A1* | 8/2012 | Stoner et al. | 715/234 |
| 2012/0210203 A1* | 8/2012 | Kandekar et al. | 715/230 |
| 2012/0210269 A1 | 8/2012 | Yonemoto | |
| 2012/0221968 A1 | 8/2012 | Patterson et al. | |
| 2012/0231441 A1 | 9/2012 | Parthasarathy et al. | |
| 2012/0233539 A1* | 9/2012 | Reed | 715/234 |
| 2012/0233552 A1 | 9/2012 | Chee et al. | |
| 2012/0235946 A1 | 9/2012 | Zotov et al. | |
| 2012/0236201 A1 | 9/2012 | Larsen et al. | |
| 2012/0240025 A1 | 9/2012 | Migos et al. | |
| 2012/0246343 A1 | 9/2012 | Story et al. | |
| 2012/0284348 A1* | 11/2012 | Rothschild | 709/206 |
| 2012/0310642 A1 | 12/2012 | Cao et al. | |

(56) References Cited

U.S. PATENT DOCUMENTS

| | | | |
|---|---|---|---|
| 2012/0311438 | A1 | 12/2012 | Cranfill et al. |
| 2012/0311509 | A1* | 12/2012 | Maggiotto et al. ............ 715/863 |
| 2013/0041747 | A1 | 2/2013 | Anderson et al. |
| 2013/0080471 | A1 | 3/2013 | Forte et al. |
| 2013/0080968 | A1* | 3/2013 | Hanson et al. ................ 715/783 |
| 2013/0130216 | A1 | 5/2013 | Morton et al. |
| 2013/0149681 | A1 | 6/2013 | Tinkler et al. |
| 2013/0174031 | A1 | 7/2013 | Constantinou |
| 2013/0191708 | A1 | 7/2013 | Song |
| 2014/0033030 | A1 | 1/2014 | Pfister |

FOREIGN PATENT DOCUMENTS

| | | | |
|---|---|---|---|
| JP | 2004-258932 | A | 9/2004 |
| JP | 2005-189906 | A | 7/2005 |
| JP | 2008-033945 | A | 2/2008 |
| KR | 10-2002-0002102 | A | 1/2002 |
| KR | 10-2002-0006129 | A | 1/2002 |
| KR | 10-2003-0000244 | A | 1/2003 |
| KR | 10-2005-0108231 | | 11/2005 |
| KR | 10-06952090 | B1 | 3/2007 |
| KR | 10-2008-0020122 | A | 3/2008 |
| KR | 2009-0117965 | A | 11/2009 |
| KR | 10-2010-0020246 | A | 2/2010 |
| KR | 2010-0128068 | A | 12/2010 |
| KR | 10-2011-0001105 | A | 1/2011 |
| KR | 10-2011-0046822 | A | 5/2011 |
| KR | 10-2011-0049981 | A | 5/2011 |
| KR | 10-1051149 | B1 | 7/2011 |
| KR | 10-2012-0087248 | A | 8/2012 |
| WO | WO 2007/031410 | A2 | 3/2007 |
| WO | WO 2007/099529 | A1 | 9/2007 |
| WO | WO 2012/115853 | A2 | 8/2012 |

OTHER PUBLICATIONS

Amazon.com, Inc., "Amazon Kindle User's Guide" 4$^{th}$ Edition, 2004-2011, pp. 1-120, can be retrieved at <URL:http://kindle.s3.amazonaws.com/Kindle_User's_Guide_4th_Edition.pdf>.
BBC, "Subtext," BBC-Learning Development, 1 page, [online] [retrieved on Apr. 23, 2012] Retrieved from the internet <URL: http://www.bbcattic.org/learningdevelopment/projects_subtext.shtml>.
BBC, "Bitesize Book Notes—Give You Brain a Boost," BBC-Book Notes, 2012, 1 page, [online] [retrieved on Apr. 23, 2012] Retrieved from the internet <URL:http://www.bbc.co.uk/schools/gcsebitesize/booknotes/>.
Damm, D., et al., "SyncTS: Automatic synchronization of speech and text documents," AES 42$^{ND}$ International Conference, Ilmenau, Germany, Jul. 22-24, 2011, pp. 1-10.
Koolen, C., et al., "Electronic Environments for Reading: An Annotated Bibliography of Pertinent Hardware and Software (2011)," 95 Pages.
Landoni, M., "Evaluating E-books," BooksOnline'10, Oct. 26, 2010, pp. 43-46.
Landoni, M., "The Active Reading Task: E-books and their Readers," BooksOnline'08, Oct. 30, 2008, ACM, pp. 33-36.
Lei, D., "Define, translate and search for words in Google eBooks," Google Books Search, Google Inc., May 19, 2011, 3 pages, [online] [retrieved on Apr. 23, 2012] Retrieved from the internet <URL:http://booksearch.blogspot.com/2011/05/define-translate-and-search-for-words.html>.
Mickey, K., et al., "E-Textbooks in Higher Education," Simba Information, 2010, 69 Pages.
Murray, A., "Discover more than 3 million Google eBooks from your choice of booksellers and devices," Google Books Search, Google Inc., Dec. 6, 2010, 2 pages, [online] [retrieved on Apr. 23, 2012] Retrieved from the internet <URL:http://booksearch.blogspot.com/2010/12/discover-more-than-3-million-google.html>.
Neary, L., "Children's Book Apps: A New World of Learning," NPR, Mar. 28, 2011, 3 pages, can be retrieved at <URL:http://www.npr.org/2011/03/28/134663712/childrens-book-apps-a-new-world-of-learning>.
Socialtext, Inc., "Socialtext 5.0 Features," 2012, 2 pages, [online] [retrieved on Apr. 23, 2012] Retrieved from the internet <URL:http://www.socialtext.com/features/>.
Subtext, "Subtext User Guide," 2011, 44 pages, can be retrieved at <URL:http://www.subtext.com/downloads/Subtext-User-Guide.pdf>.
Ribiére, M., et al., "The sBook: towards Social and Personalized Learning Experiences," BooksOnline'10, Oct. 26, 2010, ACM, 6 pages, can be retrieved at <URL:http://research.microsoft.com/en-us/events/booksonline10/ribiere-etal.pdf>.
Robinson, J., et al., "Using Linked Data to Reduce Learning Latency for e-Book Readers," ESWC 2011 Workshops, LNCS 7117, 2012, pp. 28-34.
Vignoli, F., et al., "A Text-Speech Synchronization Technique with Applications to Talking Heads," ISCA Archive, Auditory-Visual Speech Processing, Aug. 7-10, 1999, 5 Pages.
Webpage for Whatever.com, 2011, 1 page, [online] [retrieved on Aug. 31, 2011] retrieved from the internet <URL: http://www.whatever.com/>.
Wilson, R., et al., "The WEB Book experiments in electronic textbook design," Journal of Documentation, 2003, pp. 454-477, vol. 59, No. 4.
ZiiLABS, "Creative Patents Found for "Drag and Drop" on Touchscreen Devices, Revealing Tabbed Web Browsing," Tech in Hiding, Aug. 7, 2009, 6 pages, [online] [retrieved on Jul. 18, 2011] Retrieved from the internet <URL: http://creative.techinhiding.com/2009/08/creative-patents-found-for-drag-and-drop-on-touchscreen-devices-suggesting-multi-tab-web-browsing/>.
PCT International Search Report and Written Opinion, PCT/US2012/025467, Jan. 2, 2013, 7 pages.
Office Action for U.S. Appl. No. 13/182,809, Jan. 25, 2013, 13 Pages.
Office Action for U.S. Appl. No. 13/182,733, Jan. 30, 2013, 13 Pages.
Marshall, C., et al., "Turning the Page on Navigation," JDCL'05, Jun. 7-11, 2005, pp. 225-234.
PCT International Search Report and Written Opinion, PCT Application No. PCT/US2012/023628, Aug. 22, 2012, 9 pages.
PCT International Search Report and Written Opinion, PCT Application No. PCT/US2012/023584, Sep. 25, 2012, 9 pages.
PCT International Search Report and Written Opinion, PCT Application No. PCT/US2012/025438, Sep. 19, 2012, 12 pages.
PCT International Search Report and Written Opinion, PCT Application No. PCT/US2012/025443, Sep. 10, 2012, 11 pages.
PCT International Search Report and Written Opinion, PCT Application No. PCT/US2012/023599, Sep. 10, 2012, 9 pages.
Hamalainen, M., et al., "Electronic Markets for Learning: Education Brokerages on the Internet," Communications of the ACM, Jun. 1996, pp. 51-58, vol. 39, No. 6.
Parke, F., "Interactive Tools to Support Animation Tools," Computer Graphics Laboratory, New York Institute of Technology, ACM, 1986, pp. 89-91.
PCT International Search Report and Written Opinion, PCT/US2012/051643, Mar. 13, 2013, 9 Pages.
PCT International Search Report and Written Opinion, PCT/US2012/052622, Feb. 19, 2013, 9 Pages.
PCT International Search Report and Written Opinion, PCT/US2013/023683, May 13, 2013, 10 Pages.
Provisional Patent Application filed for U.S. Appl. No. 61/350,965, filed Jun. 3, 2010, 61 Pages.
PCT International Search Report and Written Opinion for PCT/US2012/025339, Aug. 27, 2013, 12 Pages.
PCT International Search Report and Written Opinion, PCT/US2012/034810, Jul. 29, 2013, 8 Pages.
PCT International Search Report and Written for PCT/US2013/056337, Nov. 26, 2013, 9 Pages.
PCT International Search Report and Written for PCT/US2013/058782, Dec. 17, 2013, 7 Pages.
Kara, et al., "Hierarchical Parsing and Recognition of Hand-Sketched Diagrams," ACM, 2004, pp. 13-22.
Liao, C., et al., "PapierCraft: A Gesture-Based Command System for Interactive Paper," ACM Transactions on Computer-Human Interaction, Jan. 2008, pp. 18:1-18:27, vol. 14, No. 4, Article 18.
Ajima, "Digital Book System and Content Server," WIPO, 2011, pp. 1-16.

(56) References Cited

OTHER PUBLICATIONS

Extended European Search Report for European Patent Application No. EP 12749553.9, May 4, 2015, 8 Pages.
Gibson, B., "The Simpsons-The Complete Fifth Season," DVD Talk, Dec. 23, 2004, 7 Pages, [online] [Retrieved on Jan. 27, 2015] Retrieved from the Internet <URL:http://www.dvdtalk.com/reviews/13784/simpsons-the-complete-fifth-season-the/>.
Extended European Search Report for European Patent Application No. EP 12842720, Mar. 19, 2015, 7 Pages.
Extended European Search Report for European Patent Application No. EP 12749201.5, Apr. 28, 2015, 9 Pages.
Chu, Y-C., et al., "Realistic books: a bizarre homage to an obsolete medium?," Proceedings of the 2004 Joint ACM/IEEE Conference on Digital Libraries, Jun. 7, 2004, Tucson, Arizona, pp. 78-86.

* cited by examiner

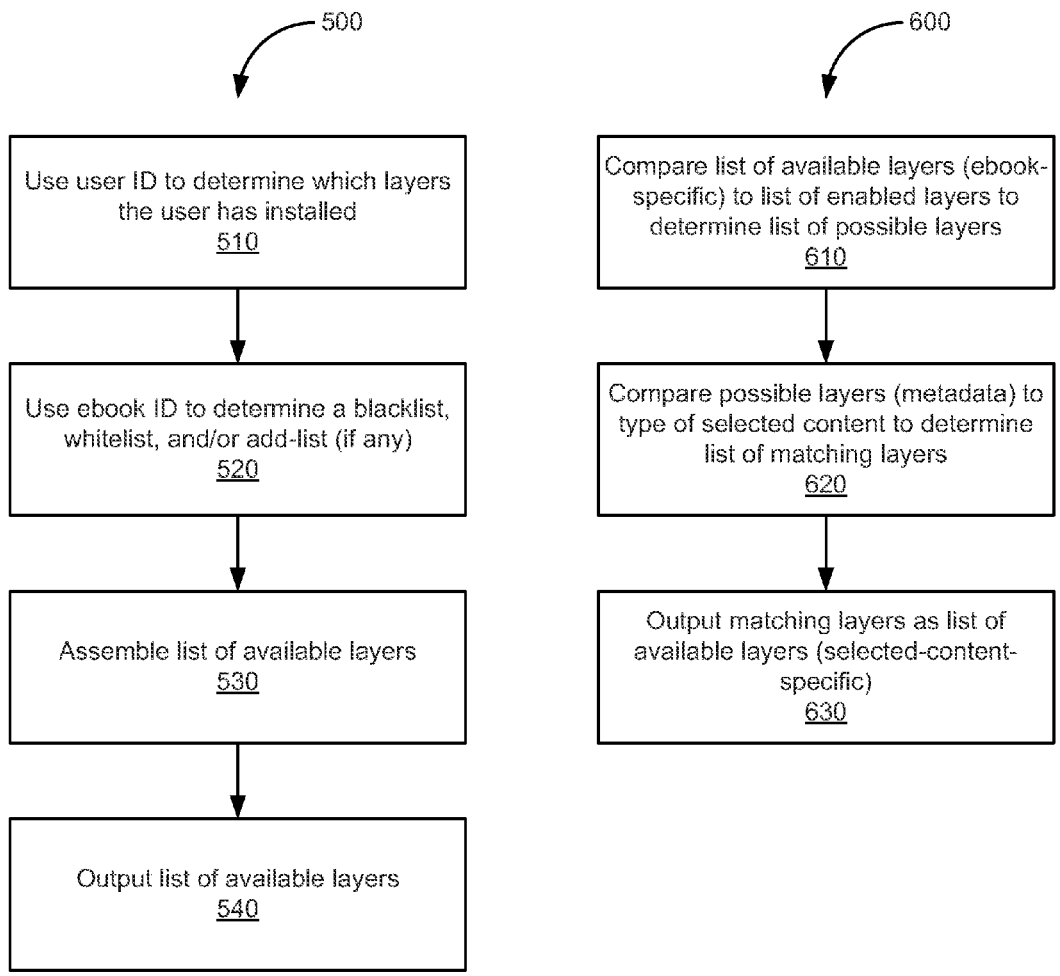

EXTENSIBLE FRAMEWORK FOR EREADER TOOLS

BACKGROUND

1. Technical Field

The invention generally relates to the field of electronic books and in particular to a framework for tools for interacting with electronic books.

2. Background Information

Electronic books ("ebooks") come in a variety of formats (e.g., IDPF/EPUB and PDF) and can be read using a variety of devices (e.g., dedicated reading devices and general-purpose mobile devices, tablet computers, laptop computers, and desktop computers). Each device includes reading software ("ereader") that displays an ebook to a user. An ereader that enables a user to interact with an ebook is generally specific to a particular device, a particular ebook format, and/or a particular ebook. Also, the interaction functionality is usually built-in to the ereader. Since ereaders come with limited sets of functionality, software developers want to extend existing functionality and/or add new functionality. However, no framework exists for implementing ereader functionality.

SUMMARY

The above and other issues are addressed by a computer-implemented method, non-transitory computer-readable storage medium, and computer system for extending functionality of an ereader module that is displaying an electronic book ("ebook"). An embodiment of the method comprises receiving, from a client device executing the ereader module, a user identifier specifying a user using the client device and an ebook identifier specifying the ebook displayed by the ereader module. The method further comprises determining one or more ereader tools ("layers") associated with the user; determining one or more layers associated with the ebook; and transmitting a list of layers to the client device. The client device enables the user to select a layer and use the selected layer to interact with content of the ebook.

An embodiment of the medium stores executable computer program instructions for extending functionality of an ereader module that is displaying an ebook. The instructions receive, from a client device executing the ereader module, a user identifier specifying a user using the client device and an ebook identifier specifying the ebook displayed by the ereader module. The instructions further determine one or more layers associated with the user; determine one or more layers associated with the ebook; and transmit a list of layers to the client device. The client device enables the user to select a layer and use the selected layer to interact with content of the ebook.

An embodiment of the computer system for extending functionality of an ereader module that is displaying an ebook comprises at least one non-transitory computer-readable storage medium storing executable computer program instructions. The instructions comprise instructions for receiving, from a client device executing the ereader module, a user identifier specifying a user using the client device and an ebook identifier specifying the ebook displayed by the ereader module. The instructions further determine one or more layers associated with the user; determine one or more layers associated with the ebook; and transmit a list of layers to the client device. The client device enables the user to select a layer and use the selected layer to interact with content of the ebook.

BRIEF DESCRIPTION OF THE DRAWINGS

FIG. 5 is a flowchart illustrating a method of determining which layers are available for a specified user to use with a specified ebook according to one embodiment.

FIG. 6 is a flowchart illustrating a method of determining which layers are available to interact with selected ebook content according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
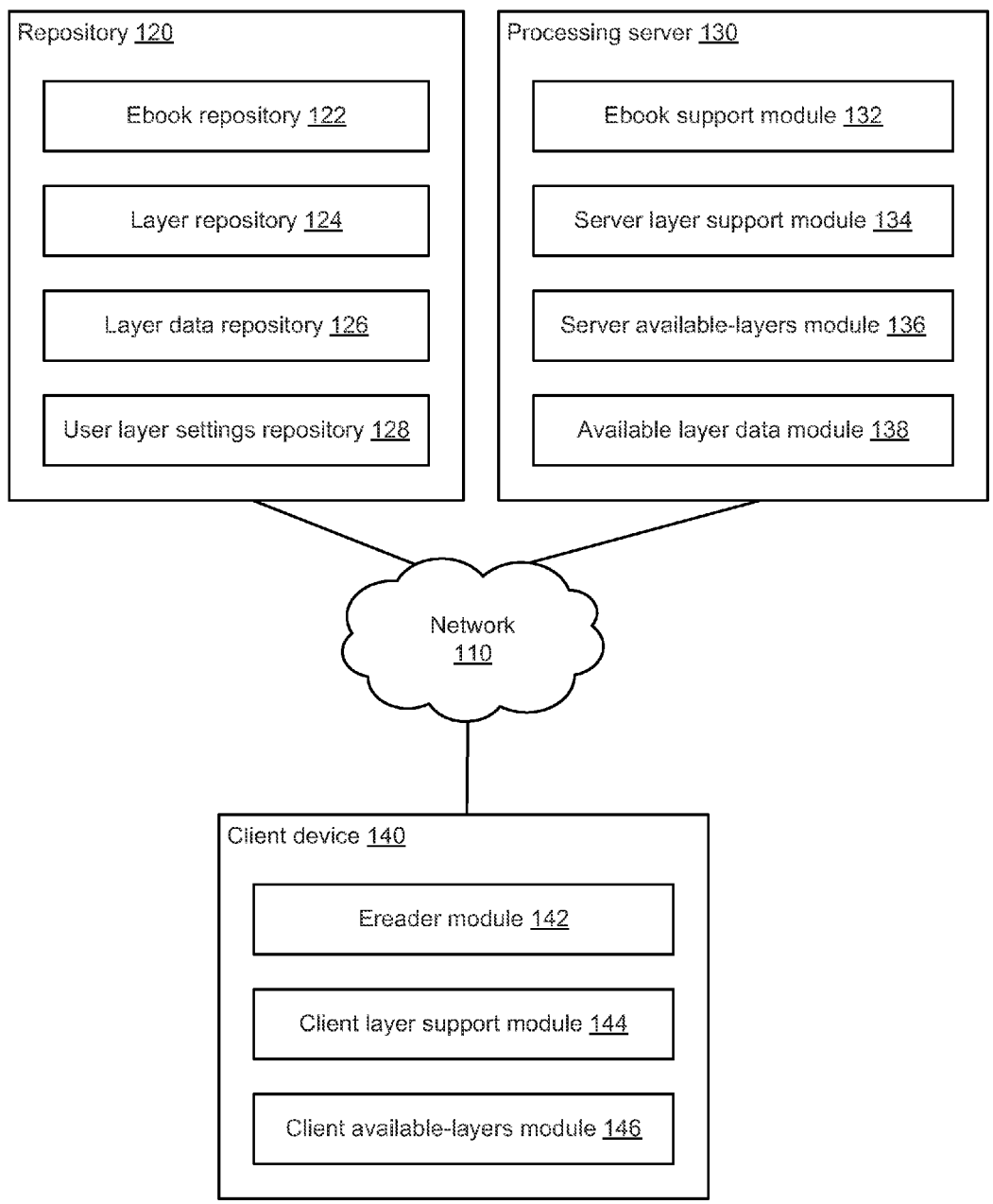
FIG. 1 is a high-level block diagram illustrating an environment for providing a framework for ereader tools according to one embodiment.

FIG. 1 is a high-level block diagram illustrating an environment 100 for providing a framework for tools for use with electronic book reading software ("ereaders") according to one embodiment. The environment 100 may be maintained by an enterprise that enables interaction with electronic books ("ebooks"), such as a corporation, university, or government agency. As shown, the environment 100 includes a network 110, a repository 120, a processing server 130, and a client device 140. While only one of each entity is shown in the embodiment depicted in FIG. 1 for clarity, other embodiments can have multiple repositories 120, processing servers 130, and/or client devices 140.

The network 110 represents the communication pathway between the repository 120, the processing server 130, and the client device 140. In one embodiment, the network 110 uses standard communications technologies and/or protocols and can include the Internet. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 110 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 110 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPiNs), Internet Protocol security (IPsec), etc. In another embodiment, the entities on the network 110 can use custom and/or dedicated data communications technologies instead of, or in addition to, the ones described above.

The client device 140 is used by a user to interact with an ebook. The client includes an ereader module 142 that enables the user to view the ebook, a client layer support module 144 that enables an ereader tool ("layer") to be used to interact with the ebook, and a client available-layers module 146 that determines which layers are available to interact with selected ebook content.

The ereader module 142 enables a user to view and/or read an ebook. The ereader module 142 also communicates with the ebook support module 132 (part of the processing server 130) to obtain ebooks that are stored in the ebook repository 122 (part of the repository 120). In one embodiment, the ereader module 142 is a JavaScript program that executes on the client device in conjunction with a web browser (also executing on the client device).

The client layer support module 144 enables a layer to be used to interact with art ebook. The client layer support module 144 also communicates with the server layer support module 134 (part of the processing server 130) to obtain layer information that is stored in the layer repository 124 and the layer data repository 126 (part of the repository 120).

A layer enhances the functionality of the ereader module 142 by enabling a user to interact with an ebook that is being presented by the ereader module. Specifically, a layer enables a user to interact with particular ebook content (e.g., content that the user has selected or content that is associated with "layer data"). In this way, a layer adds contextually useful interactivity to the ebook. The particular ebook content may be text, art image, or other embedded content. In one embodiment, multiple types of content can be interacted with simultaneously. A layer is able to display information, such as information from the ebook, information from layer data, and/or information generated based on same. A layer is able to store data and associate it with particular ebook content. The data is referred to as an "annotation" (part of the layer data stored in the layer data repository 128), and the ebook content with which the data is associated is referred to as "annotated content." An existing annotation can be obtained from the layer data repository 126, and a new annotation can be created by a layer (e.g., due to user interaction with the layer). Annotations are discussed below with reference to layer data and layer data repository 126. A layer includes executable code and metadata. Layer executable code is a computer program module ("layer module") that executes on the client.

Layers can provide various types of functionality for interacting with ebook content. Layers can be created by anyone, such as third parties and/or book publishers. Exemplary layers include Margin Notes, Define, Translate, Search Book, Search Internet, and Search Encyclopedia.

Margin Notes—The Margin Notes layer enables a user to highlight and/or add a note to content in an ebook. The user selects content in the ebook and then uses the Margin Notes layer to highlight the selected content (in any of a variety of colors) and/or enter information (a "note") to associate with the selected content. The user specifies a desired highlight color by selecting a displayed color (e.g., yellow, green, pink, or blue) or uses a default color (e.g., yellow). The note information can include, for example, typed characters, a URL, handwritten information, or multimedia (e.g., a still image, a video, or audio). If particular ebook content is already associated with a note, then hovering the cursor over that content will cause the note to be displayed. The displayed note can then be edited or deleted if desired. The highlight color and the note information are examples of annotations (part of layer data), which are discussed below with reference to layer data repository 126.

Define—The Define layer enables a user to view the definition of text in an ebook. The user selects text in the ebook and then uses the Define layer to display a definition of the selected text. For example, a popup window appears with the selected text's definition.

Translate—The Translate layer enables a user to view the translation of text in an ebook. The user selects text in the ebook and then uses the Translate layer to display a translation of the selected text. The user specifies the language of the selected text and the language for the desired translation. For example, a popup window enables the user to specify these languages. The popup window then shows the appropriate translation. In one embodiment, the Translate layer uses the Google Translate translation service.

Search Book—The Search Book layer enables a user to search an ebook for text within that ebook. The user selects text in the ebook and then uses the Search Book layer to search for the selected text in that same ebook. The Search Book layer displays the search results (e.g., a list of citations).

Search Internet—The Search Internet layer enables a user to search the Internet for text in an ebook. The user selects text in the ebook and then uses the Search Internet layer to search the Internet for the selected text. The Search Internet layer displays the search results (e.g., a list of web sites).

Search Encyclopedia—The Search Encyclopedia layer enables a user to search an electronic encyclopedia for text in an ebook. The user selects text in the ebook and then uses the Search Encyclopedia layer to search the encyclopedia for the selected text. The Search Encyclopedia layer displays the search results (e.g., a relevant encyclopedia article).

In one embodiment, more than one layer can be used at the same time and/or multiple instances of the same layer can be used at the same time (e.g., for different selected or annotated ebook content). In another embodiment, layers cannot interact with each other. While multiple layers can be used simultaneously (possibly for the same selected or annotated content), the layers are isolated from each other.

In one embodiment, the client layer support module 144 includes functionality related to enabling/disabling layers, launching layers, indicating the presence of annotations, and providing an application programming interface (API) to layers. Regarding enabling/disabling layers, the client layer support module 144 enables a user to enable/disable layers. Enabled layers can be provided as options in a layer popup menu (discussed below with reference to manual launch of a layer), while disabled layers cannot. Also, annotations associated with enabled layers can be displayed automatically (discussed below with reference to automatic launch of a layer). In one embodiment, a user can designate an enabled layer as "automatic-launch," which causes the layer to be launched when the ereader module 142 displays ebook content associated with a relevant annotation (described below). In one embodiment, a graphical user interface lists "installed" layers (indicated by the user layer settings repository 128), and the user enables/disables these layers (and possibly marks them as "automatic-launch") by checking/unchecking various boxes. These settings are then stored and made available by the client layer support module 144.

Regarding launching layers, the client layer support module 144 launches a layer (i.e., creates an instance of a layer) so that a layer module is executed by the client device. An instance of a layer (e.g., content dynamically rendered by a layer) is displayed within the ereader module's main window.

In one embodiment, a layer can be displayed in various modes, such as overlay (floating above an entire page of ebook content), replace (floating above particular ebook content, thereby "hiding" the ebook content), side panel (present in a side panel adjacent to the ebook content, possibly in the form of a small preview that can be interacted with), and margin (present in a margin area of the ebook content, possibly in the form of a very limited preview). The ereader module 142 allocates a display area inside of which a layer can create user interface (UI) controls. The ereader module 142 instructs the layer to render itself into the appropriate display area and informs the layer of the context in which it is rendering itself (e.g., overlay, replace, side panel, or margin). The display area that is allocated depends on the layer's display mode. In one embodiment, a layer cannot modify the size of its display area, move the display area, or create UI elements outside of the display area. In another embodiment, a layer can request the properties of its display environment (e.g., display mode, display area size, display area location, and pinning status) and/or be notified of any changes.

In one embodiment, when the client layer support module 144 launches a layer, the client layer support module 144 also sends layer usage data to the server layer support module 134. The server layer support module 134 then stores the layer usage data. In one embodiment, layer usage data includes a layer ID of the layer that was launched, a display mode in which the layer was launched, a user 11), an ebook ii), an associated (e.g., selected or annotated) content range, ebook context (discussed below with reference to the Layer API and a context object), web browser information, and/or client device information.

The client layer support module 144 provides two ways to launch a layer: manually and automatically. Manual launch of a layer involves a popup menu that enables a user to launch a layer. Responsive to a user selecting ebook content (presented by the ereader module 142), the client layer support module 144 uses the client available-layers module 146 (discussed below) to determine which layers are available for interacting with the selected content. The client layer support module 144 then displays a popup menu listing the available layers. In one embodiment, the available layers are listed in the popup menu according to a sort order. One example of a sort order is alphabetical order. Another example of a sort order is popularity (e.g., popularity of using a particular layer (layer ID) to interact with a particular ebook (ebook ID) or with a particular content range within a particular ebook). Popularity is determined based on, for example, the layer usage data stored by the server layer support module 134. The client layer support module 144 obtains layer usage data from the server layer support module 134 and uses the data to sort the available layers according to their popularity. Responsive to the user selecting a layer entry from the menu, an instance of that layer is launched with respect to the selected content using a particular display mode.

Automatic launch of a layer involves layer data associated with ebook content. Responsive to ebook content being displayed by the ereader module 142, the client layer support module 144 determines whether any layer data is associated with the ebook content. If layer data is associated with the ebook content (i.e., if the ebook content is "annotated"), then the client layer support module 144 determines whether that layer data indicates that a layer should be automatically launched. In one embodiment, there are two ways in which layer data can indicate that a layer should be automatically launched. One way is that the layer indicated by the layer data (e.g., the Layer ID data item in Table 1) has been designated by the user as "automatic-launch" (part of enabling/disabling layers, discussed above). Another way is that a) the annotated content style indicated by the layer data (e.g., the Style data item in Table 1) specifies that the layer indicated by the layer data should be automatically launched and b) the layer indicated by the layer data has been enabled by the user. The client layer support module 144 then automatically launches the layer with respect to the layer data using a particular display mode. Note that automatic layer launch causes layer content (e.g., annotations or data provided by layers) to be displayed, even if the associated ebook content has not been selected by the user.

Note that the module of the layer must exist on the client device 140 before the layer instance can be launched. In one embodiment, the layer module is transferred from the repository 120 to the client device 140 (via the processing server 130 and the network 110) when the list of available layers is received in step 430 of FIG. 4. For example, the modules of all available layers are transferred or the modules of only the "installed" available layers (as indicated in the user layer settings repository 128) are transferred. In another embodiment, the layer module is transferred when an attempt is made to launch the layer, either manually (e.g., using a popup menu) or automatically (e.g., based on layer data). For example, the client layer support module 144 detects the attempt and, in response, sends a request to the server layer support module 134 (via the network 110) for the relevant layer module. The server layer support module 134 receives the request and, in response, sends the relevant layer module to the client layer support module 144 (via the network 110). In yet another embodiment, the layer module is transferred at any other suitable time.

Note that the layer module can already be present on the client device 140 due to having been transferred in the past. In one embodiment, a layer module on the client device is deleted after the ereader module 142 ceases executing. In another embodiment, a layer module on the client device remains on the client device even after the ereader module ceases executing. If a layer module remains, the module can be updated later on as necessary (e.g., as indicated by a module version number).

Regarding indicating the presence of annotations, the client layer support module 144 can visually indicate ebook content (presented by the ereader module 142) that is associated with an annotation (part of layer data). For example, the client layer support module 144 highlights or otherwise styles the ebook content that is associated with the annotation (referred to as "annotated content"). In one embodiment, the client layer support module 144 visually indicates only annotated content that is associated with an annotation whose associated layer is enabled. In this embodiment, the client layer support module 144 does not visually indicate annotated content that is associated with an annotation whose associated layer is disabled.

In one embodiment, the display style of annotated content ("annotated content style") is configurable from a fixed set of options. Options include, for example, simple formatting, display mode, and automatic layer launch. Simple formatting includes, for example, text style options (e.g., font, color, highlighting, italics, boldface, underlining, and outlining) and indicators (e.g., mini-icons or chiclets) that are displayed in the ebook margins or alongside ebook content to indicate that a particular type of layer has content available near that location. In one embodiment, annotated content is indicated in the page slider presented by the ereader module 142. This makes it easy for the user to return to a page with annotated content. Display mode includes a default or preferred display mode in which to launch a particular layer (e.g., the layer associated with the annotation) (e.g., overlay, replace, side panel, or margin). Automatic layer launch specifies that a particular layer (e.g., the layer associated with the annotation that is associated with the annotated content) should be automatically launched when the annotated content is displayed by the ereader module 142. Note that simple formatting, display mode, and automatic layer launch can be used independently of each other. For example, if automatic layer launch is used without simple formatting, then the annotated content does not appear differently from non-annotated content; however, a layer is automatically launched when the annotated content is displayed.

Display styles can be set on a case by case basis, so different instances of ebook content associated with annotations saved by the same layer can be displayed differently (e.g., yellow highlighting versus green highlighting for different passages annotated by the same Margin Notes layer). Note that when an existing annotation is saved, the annotated content style of the layer data can be modified. For example, consider an Inscription Layer that enables an inscription to be added to an ebook. The annotated content style of Inscription Layer layer data specifies that the annotated content does not appear differently from non-annotated content. However, when the annotated content is displayed, the Inscription Layer is automatically launched in overlay mode (floating above the entire page of ebook content that contains the annotated content), and the inscription (as specified in the annotation portion of the Inscription Layer layer data) is displayed. The user views the inscription and closes the Inscription Layer, Responsive to the Inscription Layer being closed, the annotated content style of the Inscription Layer layer data is updated. The updated style specifies that the next time the annotated content is displayed, the Inscription Layer is not automatically launched. Instead, an icon is displayed in the margin and can be used to access the inscription stored in the annotation portion of the Inscription Layer layer data.

Note that layer data must exist on the client device 140 before the annotation (part of layer data) can be displayed. In one embodiment, layer data is transferred from the repository 120 to the client device 140 (via the processing server 130 and the network 110) in response to a request from the client layer support module 144 (see steps 440 and 460 in FIG. 4).

In one embodiment, a layer cannot draw its own style for annotated content. In this embodiment, the client layer support module 144 indicates annotated content using a configurable style (e.g., selected by the user). In one embodiment, layer data can specify its own style for annotated content. For example, the annotated content style is indicated by the Style data item (see Table 1).

In one embodiment, a "layers side panel" view for an ebook includes one area that displays ebook content and another area (a "layers side panel") that displays layer content (e.g., annotations). The layers side panel area is adjacent to the ebook content area and can differ in size relative to the ebook content area. When an ebook is displayed in side panel view, layers are automatically launched in side panel display mode when relevant annotated content is displayed in the ebook content area (regardless of the annotated content style specified in the layer data and regardless of whether the layers have been designated as "automatic-launch"). In another embodiment, a "layers display" view for an ebook shows all of the layer content (e.g., annotations) associated with the ebook in a single view, organized by category, by prominence, or in any other way that makes sense. For example, the layers display view displays annotations on a page-by-page basis, corresponding to the pages of the ebook (whether or not the ebook content is also displayed).

A layer uses an API provided by the client layer support module 144 (referred to as the "Layer API") In one embodiment, the client layer support module 144 provides a JavaScript API. The Layer API includes various functions. Exemplary functions are described below:

(i) A function to obtain the ebook content for which the layer was invoked and to which the layer can attach an annotation (referred to as "content range"). For example, the function calls a piece of executable code (a "callback") with an object describing the content range. The content range may include content of various types (e.g., text content, audio content, and image content). The content range may include multiple annotated content segments. These annotated segments are represented as individual ranges within the entire content range. The content range object provides methods to access these ranges.

(ii) A function to save an annotation (part of layer data) and an annotated content style and associate them with a content range, replacing any previously saved annotation and annotated content style.

(iii) A function to load an annotation (part of layer data) previously saved by this layer and associated with a content range.

(iv) A function to navigate an ebook (i.e., control which portion of the ebook is displayed by the ereader module 142). In one embodiment, this function includes the ability to navigate backwards one page, navigate forwards one page, go to a specific chapter, go to a specific page, go to a specific position within a page, and go to a specific piece of content (e.g., an image, table, or figure).

(v) A function to search inside an ebook (e.g., using functionality from the ereader module 142). A search panel is displayed, and search results are highlighted. The layer remains visible.

(vi) A function to close the layer instance so that the layer is no longer displayed.

A layer can access the ebook content for which it was launched (e.g., selected content or annotated content) and also a context object. In one embodiment, the context object includes only context that is local to the ebook and the user's interaction with the ebook. Local context includes, for example, ebook title, author, publisher, indication of currently-displayed portion of ebook (e.g., chapter number and page number), indication of current ebook display mode (e.g., flowing text versus scanned image), and device capabilities. In another embodiment, additional context is provided such as related books, most popular pages in the ebook, etc. The additional context can be provided in the same context object or through additional Layer API functions.

In one embodiment, the Layer API enables a layer to specify an annotated content style. In another embodiment, a generic UI control is provided by the ereader module 142 so that the user can specify the annotated content style. In this UI, the user can specify "use this display style for the current annotated content only" or "use this display style for all content annotated by this layer," In yet another embodiment, a layer can indicate whether a generic UI control should be displayed to specify annotated content style or whether the layer will provide its own UI controls to specify annotated content style.

The client available-layers module 146 determines which layers are available to interact with selected ebook content. Specifically, the client available-layers module 146 takes as input a list of available layers (output by the server available-layers module 136), selected content, and a list of enabled layers and outputs a list of layers that are available for interacting with the selected content. The client available-layers module 146 compares the list of available layers to the list of enabled layers to determine a list of possible layers (i.e., layers that are both available and enabled). The type of the selected content (e.g., text versus image) is then compared to the possible layers (specifically, to the layers' metadata, which specifies what type of ebook content can be interacted with using each layer). The client available-layers module 146 outputs the matching layers as a list, Note that this list of layers is selected-content-specific.

The repository 120 is a computer (or set of computers) that stores an electronic book ("ebook") repository 122, an ereader tool ("layer") repository 124, a layer data repository 126, and a user layer settings repository 128. In one embodiment, the repository 120 includes a server that provides the processing server 130 access to the ebook repository 122, layer repository 124, layer data repository 126, and user layer settings repository 128 in response to requests.

The ebook repository 122 stores various ebooks. In one embodiment, an ebook adheres to the JavaScript Object Notation (JSON) format. An ebook includes content and metadata. Ebook content includes an electronic collection of text (and possibly additional types of content such as images and/or sound). For example, ebook content includes content of a book such as would be printed on the pages of a traditional paper-based book. All of the text in the collection may be from a single source, or the collection may contain text from different sources. The text may have originated in a traditional paper-based format (e.g., a physical book or newspaper), or it may have originated in a digital format (e.g., electronic files in a format such as Portable Document Format (PDF)). The content of an ebook is divided into segments so that portions of the content can be transferred and/or loaded separately. For example, an ebook can include one segment for each chapter. In one embodiment, ebook content includes files that adhere to the HTML for at, the Cascading Stylesheets (CSS) format, and various multimedia formats (e.g., audio files and video files).

Ebook metadata includes bibliographical information about an ebook, such as the title, author, publication date, number of pages, number of chapters, etc. Ebook metadata also includes a list of segments into which the ebook's content is divided. A segment is represented on the list by, for example, a unique identifier. In one embodiment, ebook metadata also includes a blacklist, a whitelist, and/or an add-list. These lists control which layers can be used with an ebook. A blacklist specifies layers that cannot (i.e., are not allowed to) be used with a particular ebook. A whitelist specifies layers that can (i.e., are allowed to) be used with a particular ebook. An add-list specifies layers that are recommended to be used with a particular book. For example, an ebook publisher can require that a particular ebook be interacted with in accordance with a particular blacklist, whitelist, and/or add-list. A layer is represented on a list by, for example, a unique identifier. Blacklists, whitelists, and add-lists are further described below with reference to server available-layers module 136.

The layer repository 124 stores various layers. A layer includes executable code and metadata. Layer executable code is a computer program module ("layer module") that executes on a client device 140 and enhances the functionality of an ereader module 142. A layer enables a user to interact with an ebook that is being presented by the ereader module. Specifically, a layer enables a user to interact with particular ebook content (e.g., content that the user has selected or annotated content). The particular content may be text, an image, or other embedded content. In one embodiment, multiple types of content can be selected simultaneously. In one embodiment, a layer module is implemented as a JavaScript program.

Layer metadata specifies what type of ebook content a particular layer is applicable to (i.e., what type of content can be interacted with using a particular layer). For example, a first layer can enable interaction with only textual content, while a second layer can enable interaction with only graphical content. Layer metadata also specifies which display modes (e.g., overlay, replace, side panel, and/or margin) are supported by the layer, possibly designating one of the supported display modes as the default or preferred display mode.

In one embodiment, an extensible framework for layers includes the following features: 1) An XML file format for packaging a layer's HTML, JavaScript, and application descriptor into a single file. The application descriptor indicates which types of ebook content the layer is applicable to. 2) A service that renders a layer XML file into HTML/JavaScript that can be displayed in a web browser. 3) Client-side JavaScript for existing web applications (e.g., ereader module 142 and/or client layer support module 144) to instantiate layers and display them inside a container element. The JavaScript creates sandboxed iframe HTML elements for each layer. The iframes use uniform resource locators (URLs) that point back to the service to render the requested layer. 4) Client-side JavaScript for a remote procedure call (RPC) framework that enables applications (e.g., ereader module 142 and/or client layer support module 144) to register JavaScript methods (the Layer API) that the layers cart call from their sandboxed iframes. This enables layers to call back into the application and send/receive data. Also, executing a layer in an isolated iframe prevents the layer from interfering with the operation of the ereader module 142. 5) The ability to bundle RPC methods into a user interface extension (UIX) "feature." A Books feature exposes books-specific APIs (the Layer API) to the layers via the RPC framework. A layer can indicate in its application descriptor which features it requires to execute.

Layer data repository 126 includes information concerning data that is used by a layer (e.g., to display to the user when the layer is launched). In one embodiment, the data was created by a layer during execution of the layer (e.g., due to user interaction with the layer). In another embodiment, the data was created before the layer was ever executed. (For example, the creator of a layer that is meant to display "CliffsNotes" would also create layer data with the actual CliffsNotes text. This layer data would exist before the CliffsNotes layer was ever executed and would be available to users of the CliffsNotes layer.) Layer data is associated with particular ebook content. Recall that a layer enables a user to interact with particular ebook content (e.g., content that the user has selected or annotated content). Data that is stored by a layer (e.g., a "note" added by a user with the Margin Notes layer) is associated with the particular ebook content that was selected or annotated when the layer was launched. If, at a later time, the same layer is launched with respect to the same ebook content, then the layer will load its previously stored data. This data is known as an annotation (part of layer data).

In one embodiment, data stored by a layer is accessible to only that layer and is not accessible to other layers. In another embodiment, data stored by a layer when a particular user account is active is accessible to only that user account and is not accessible to other user accounts. In yet another embodiment, data can be stored by a layer only when a user account is active (i.e., when a user has logged in) and cannot be stored when the user is anonymous.

In one embodiment, layer data includes three elements: an indication of particular ebook content (the ebook content with which the layer data is associated; "annotated content" or "content range"), a type (e.g., an indication of the particular layer that created the layer data), and an annotation (the data that a layer stores and retrieves for user interaction purposes; e.g., a "note" added by a user with the Margin Notes layer). The indication of particular ebook content is, for example, an ebook indicator, a page indicator, and a position range that includes a start position and an end position. Each position is an internal marker for a position within an ebook and includes, e.g., a paragraph indicator and an offset within that paragraph. In a graphic novel where there is no text, a position can be specified for each image. The image positions can be used to determine where a content range starts and/or ends so that images within the content range can be indicated. The indication of the particular layer that created the layer data is, for example, a layer identifier ("ID"). In one embodiment, each instance of layer data is associated with only one layer (i.e., the layer that created the layer data instance).

An ebook can be updated frequently, resulting in different versions with different content locations. Content locations between these different versions should be translated so that layer data can be associated with the correct ebook content. For example, a client 140 can request layer data for a particular page of an ebook cached at the client. If the indexed (i.e., currently live) ebook in the ebooks repository 122 is of a different version, then the pages can have changed. Also, a client 140 can save layer data that is based on an old cached version of an ebook. This layer data should be saved relative to the indexed (i.e., currently live) ebook in the ebooks repository 122.

In one embodiment, this problem is addressed by a position validation service. The position validation service keeps track of layer data positions within ebooks (specifically, positions of ebook content associated with layer data). Position information includes, for example, page information and original scanjob information (e.g., information regarding the scanning of the underlying book to create the ebook). Page information includes, for example, a volume (ebook) page ID and a volume structured page ID. Scanjob information includes, for example, a scanjob ID and a scanjob page ID. Position information can also include a volume ID, the content before the annotated content, the annotated content itself, and the content after the annotated content. In one embodiment, position information is used to localize a layer data position within an old version of an ebook within a new version of the same ebook. Text alignment is then performed (using, for example, the Associated Ebook Text item in Table 1) to calculate an exact position.

Table 1 shows data items that are stored for each instance of layer data according to one embodiment.

TABLE 1

| Data item Name | Data Item Description |
|---|---|
| Volume ID | the volume (ebook) the layer data is for |
| Layer ID | the layer the layer data is for |
| User ID | the user id of the owner |
| ACL | the permissions for the layer data |
| Page Id | the multiple page ids the layer data can span |
| Before Text | the text before the associated (selected or annotated) ebook content (if any) |
| After Text | the text after the associated (selected or annotated) ebook content (if any |
| Associated Ebook Text | the text portion (if any) of the associated (selected or annotated) ebook content |
| Style | the style information for associated (selected or annotated) ebook content (e.g., simple formatting and/or automatic layer launch; "annotated content style") |
| Data | the data to store for the layer (for user interaction purposes; "annotation") |
| Client Sent Range Association | start/end position and start/end offset for multiple position types (text, image, canonical fragment indicators (CFI), EPUB marker); the range information, including content version, of where the associated (selected or annotated) content is exactly located for the specified version of the volume when this layer data was last created or modified as sent by the client |
| Current Range Association | same as Client Sent Range Association but for current volume version; the current range information, including the current content version, of where the associated (selected or annotated) content is exactly located for the specified version of the volume when this layer data was last created or modified |
| Current Volume Version | current version of the volume |
| Scanjob information | helpful when moving the layer data because of content shifting (e.g., between volume versions) |
| Last Modified | timestamp of last modification for this layer data |
| Created | timestamp of when layer data was created |

In one embodiment, the Style data item in Table 1 is implemented as a dictionary object of name/value pairs for the different style attributes. The dictionary object is represented as a JSON object in JavaScript. In one embodiment, layer data can be queried by using the following parameters: a) user, b) user and volume (and possibly also page id(s)), and c) user, volume, and layer id (and possibly also page id(s)).

User layer settings repository 128 includes information concerning which layers a user has "installed." For example, the user layer settings repository 128 includes, for each user ID, a list of layers that user has installed (if any). In one embodiment, the user layer settings repository 128 also includes a default list of installed layers for use with users who are anonymous (e.g., have not logged in). Installation of a layer indicates that the user wants to use that layer at some point in time, although not necessarily all of the time. (An installed layer can be disabled, as explained above.) Installation of a layer does not indicate that the module for that layer is actually present on client device 140. Since one person can use multiple devices to read ebooks, user layer settings are stored at the repository 120. If a user wants to use a particular layer on a particular client device 140, the module for that layer will need to be present on that device. In one embodiment, a graphical user interface lists layers that are available for installation. The user installs/uninstalls these layers by checking/unchecking various boxes. These settings are then stored in the user layer settings repository 128.

The processing server 130 includes various modules such as an ebook support module 132 for handling ebook-related requests, a server layer support module 134 for handling layer-related requests, a server available-layers module 136 for determining which layers are available, and an available layer data module 138 for determining which layer data is available. In one embodiment, the processing server 130 includes a computer (or set of computers) that communicates with repository 120 and client device 140 and processes data (e.g., by executing the ebook support module 132, the server layer support module 134, the server available-layers module 136, and the available layer data module 138). In one embodiment, the processing server 130 includes a web server that responds to requests from the client device 140.

The ebook support module 132 handles ebook-related requests. Specifically, the ebook support module 132 receives requests from the ereader module 142 (part of the client device 140) and responds to them accordingly. One type of request is for ebook metadata. Another type of request is for ebook content. These requests and responses are described below with reference to FIG. 3.

The server layer support module 134 handles layer-related requests. Specifically, the server layer support module 134 receives requests from the client layer support module 144 (part of the client device 140) and responds to them accordingly. One type of request is for a list of available layers. Another type of request is for layer data. These requests and responses are described below with reference to FIG. 4.

The server available-layers module 136 determines which layers are available for a specified user to use with a specified ebook. Specifically, the server available-layers module 136 takes as input a user ID and an ebook ID and outputs a list of layers that are available for the user ID to use with the ebook ID. The server available-layers module 136 uses the user ID to determine which layers the user has installed (stored in the user layer settings repository 128). If a user ID is not provided (e.g., the user is anonymous or has not logged in), then a default list of installed layers is used (stored in the user layer settings repository 128). The server available-layers module 136 uses the ebook ID to determine a blacklist, whitelist, and/or add-list (if any) associated with the ebook (stored in ebook metadata in the ebook repository 122). The server available-layers module 136 then assembles a list of available layers by starting with the installed layers, keeping any layers that are on the whitelist (if a whitelist exists), removing any layers that are on the blacklist and not on the whitelist (if a blacklist exists), and adding any layers that are on the add-list (if an add-list exists). (If neither a blacklist nor a whitelist nor an add-list exists, then the assembled list includes all of the installed layers.) In one embodiment, wildcards can be used in the blacklist, whitelist, and/or add-list. For example, a blacklist that contains only a wildcard would cause all layers to be removed (unless the layers are on the whitelist). The server available-layers module 136 outputs the remaining layers as a list of available layers (including layer metadata such as what type of ebook content a particular layer is applicable to and which display modes are supported by a particular layer). Note that this list of layers is ebook-specific.

The available layer data module 138 determines which layer data is available for a specified user and specified pages of a specified ebook. Specifically, the available layer data module 138 takes as input a user ID, an ebook ID, and a page range and outputs layer data that is available for the user ID, the ebook ID, and the page range. The available layer data module 138 uses the user ID, the ebook ID, and the server available-layers module 136 to determine which layers are available for the specified user to use with the specified ebook. The available layer data module 138 then obtains the layer data (stored in the layer data repository 126) associated with the available layers, the specified user, the specified ebook, and the specified page range. If a user ID is not provided (e.g., the user is anonymous or has not logged in), then the available layer data module 138 obtains the layer data (stored in the layer data repository 126) associated with the available layers, "all users" (e.g., anonymous users or the general public), the specified ebook, and the specified page range. The available layer data module 138 then outputs this layer data.

Figure 2:
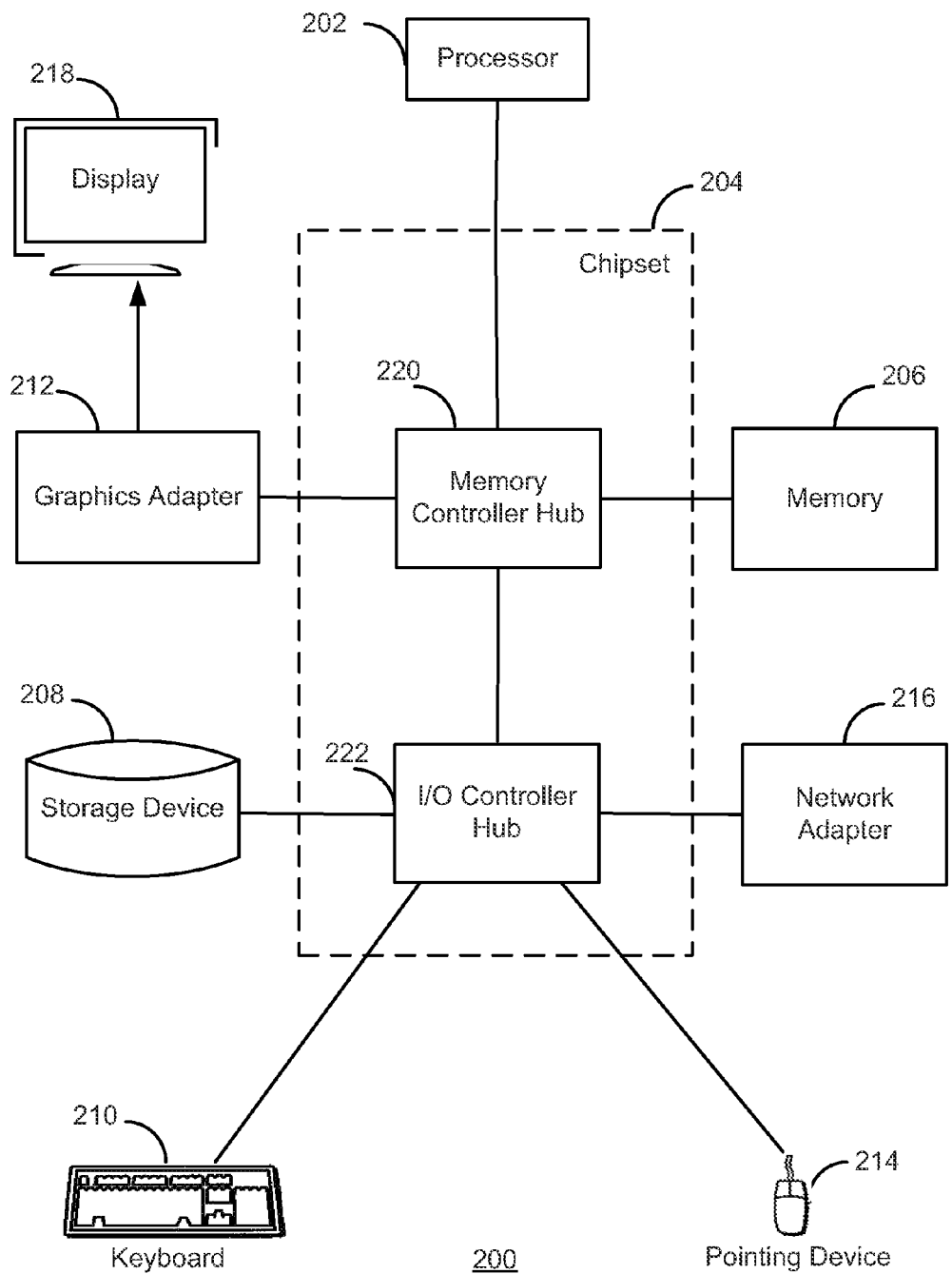
FIG. 2 is a high-level block diagram illustrating an example of a computer for use as a repository, a processing server, and/or a client device, according to one embodiment.

FIG. 2 is a high-level block diagram illustrating an example of a computer 200 for use as a repository 120, a processing server 130, and/or a client device 140 in accordance with one embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the repository 120 and/or the processing server 130 can be formed of multiple blade servers and lack a display device, keyboard, and other components, while the client device 140 can be a notebook or desktop computer, a tablet computer, or a mobile phone.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
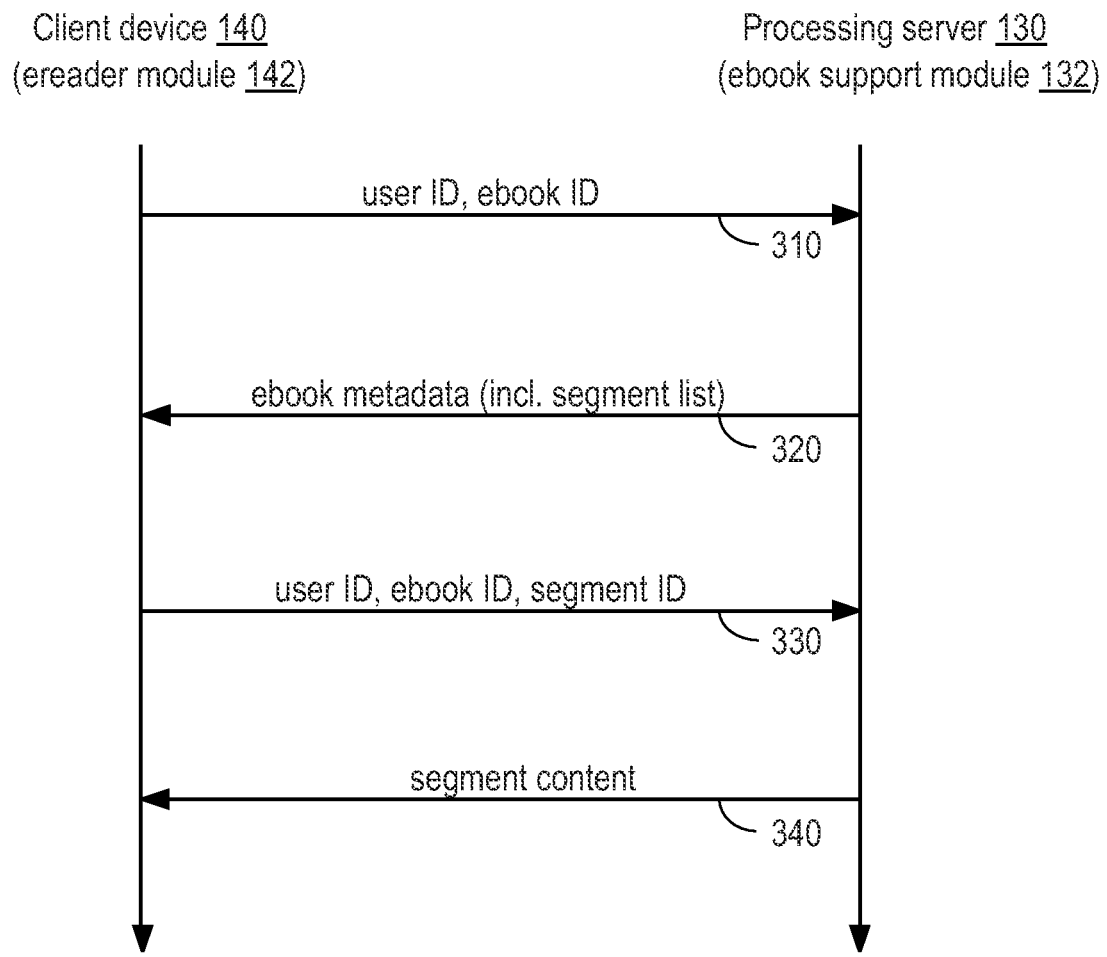
FIG. 3 is a sequence diagram illustrating steps involved in transferring ebook information according to one embodiment.

FIG. 3 is a sequence diagram illustrating steps involved in transferring ebook information according to one embodiment. In step 310, the ereader module 142 (part of the client device 140) sends to the ebook support module 132 (part of the processing server 130) a user ID and an ebook ID. The ebook support module 132 determines (not shown) whether the specified user is allowed to read the specified ebook. If the user is allowed to read the ebook, then in step 320, the ebook support module 132 sends to the ereader module 142 metadata for the specified ebook. That metadata includes, among other things, the list of segments into which that ebook's content is divided.

In step 330, the ereader module 142 sends to the ebook support module 132 a user ID, an ebook ID, and a segment ID. The ebook support module 132 determines (not shown) whether the specified user is allowed to read the specified segment of the specified ebook. If the user is allowed to read the ebook segment, then in step 340, the ebook support module 132 sends to the ereader module 142 content for the specified ebook. That content corresponds to the specified segment. In one embodiment, the segment content is transferred in art encrypted state and then decrypted at the client device 140.

In the embodiment illustrated in FIG. 3, the ebook support module 132 does not send to the ereader module 142 all of the content for the specified ebook at one time. Instead, content is transferred segment by segment (step 340) as each segment is requested (step 330). In one embodiment, after the requested segment is sent, segments for nearby pages are also sent. This way, if the user tries to view a page outside the requested segment, the appropriate segment will already exist on the client device and can be displayed.

In this embodiment, the client device 140 must be online so that the ereader module 142 can periodically request and receive segment content (as needed) from the ebook support module 132. In a different embodiment (not shown), one request from the ereader module 142 to the ebook support module 132 results in the ebook support module 132 sending all of the content for the specified ebook at one time. In this embodiment, the client device 140 need not be online after the initial request and receipt of content.

Figure 4:
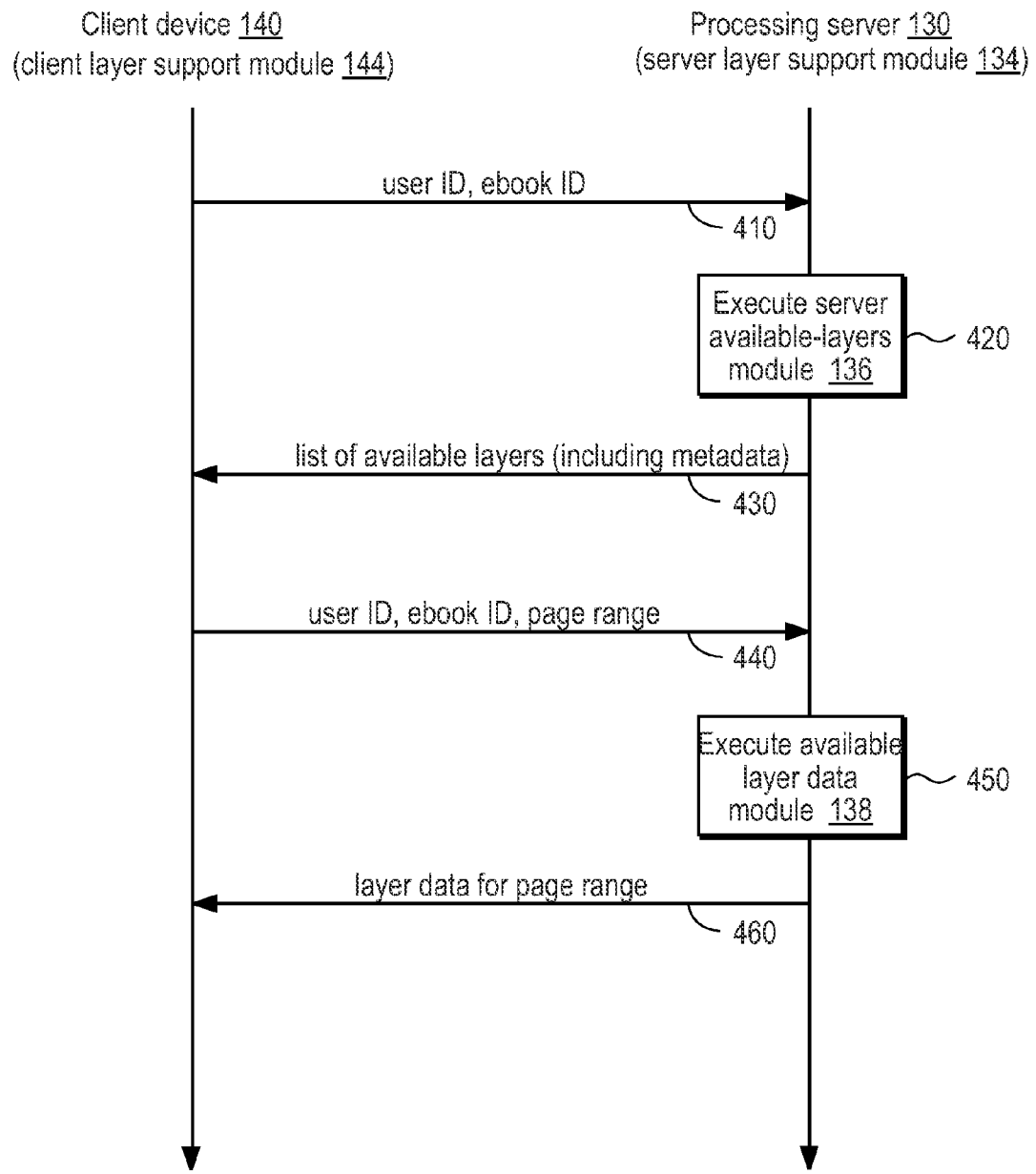
FIG. 4 is a sequence diagram illustrating steps involved in transferring layer information according to one embodiment.

FIG. 4 is a sequence diagram illustrating steps involved in transferring layer information according to one embodiment. In step 410, the client layer support module 144 (part of the client device 140) sends to the server layer support module 134 (part of the processing server 130) a user ID and an ebook ID. (The user ID is optional, as discussed above with respect to the server available-layers module 136.) The server layer support module 134 executes 420 the server available-layers module 136 to determine which layers are available for the specified user (or anonymous user) to use with the specified ebook. In step 430, the server layer support module 134 sends to the client layer support module 144 a list of available layers. That list includes, among other things, layer metadata such as what type of ebook content a particular layer is applicable to and which display modes are supported by a particular layer.

In step 440, the client layer support module 144 sends to the server layer support module 134 a user ID, an ebook ID, and a page range. (The user ID is optional, as discussed above with respect to the available layer data module 138.) The server layer support module 134 executes 450 the available layer data module 138 to determine which layer data is available for the specified user (or anonymous user) and the specified pages of the specified ebook. In step 460, the server layer support module 134 sends to the client layer support module 144 layer data for the specified ebook. That layer data corresponds to the specified pages. In one embodiment, after the layer data for the specified page range is sent, layer data for nearby page ranges is also sent. This way, if the user views a page outside the specified range, the relevant layer data will already exist on the client device and can be displayed.

FIG. 5 is a flowchart illustrating a method 500 of determining which layers are available for a specified user to use with a specified ebook according to one embodiment. Other embodiments can perform the steps in different orders and can include different and/or additional steps. In addition, some or all of the steps can be performed by entities other than those shown in FIG. 1.

When the method 500 starts, the client layer support module 144 has already sent a user ID and an ebook ID to the server layer support module 134. The server layer support module 134 then provides the user ID and the ebook ID to the server available-layers module 136. At this point, the method 500 begins.

In step 510, the user ID is used to determine which layers the user has installed. For example, the server available-layers module 136 queries the user layer settings with the user ID. The user ID is optional, as discussed above with respect to the server available-layers module 126. If no user ID is provided, then the server available-layers module 136 queries the user layer settings repository 128 for a default list of installed layers.

In step 520, the ebook ID is used to determine a blacklist, whitelist, and/or add-list (if any) associated with the ebook. For example, the server available-layers module 136 queries the ebook metadata with the ebook ID.

In step 530, a list of available layers is assembled. For example, the server available-layers module 136 starts with the installed layers, keeps any layers that are on the whitelist (if a whitelist exists), removes any layers that are on the blacklist and not on the whitelist (if a blacklist exists), and adds any layers that are on the add-list (if an add-list exists). If neither a blacklist nor a whitelist nor an add-list exists, then the assembled list includes all of the installed layers.

In step 540, the remaining layers are output as a list of available layers. For example, the server available-layers module 136 outputs the remaining layers as a list of available layers (including layer metadata such as what type of ebook content a particular layer is applicable to and which display modes are supported by a particular layer). Note that this list of layers is ebook-specific.

FIG. 6 is a flowchart illustrating a method 600 of determining which layers are available to interact with selected ebook content according to one embodiment. Other embodiments can perform the steps in different orders and can include different and/or additional steps. In addition, some or all of the steps can be performed by entities other than those shown in FIG. 1.

When the method 600 starts, the client layer support module 144 has already received a list of available layers (ebook-specific). This is the same list that was output by the server available-layers module 136 in step 420 of FIG. 4 and then sent from the server layer support module 134 to the client layer support module 144 in step 430 of FIG. 4. Also, the selected ebook content has been obtained using a Layer API function provided by the client layer support module 144. Finally, the list of enabled layers has been obtained from the client layer support module 144. At this point, the method 600 begins.

In step 610, the list of available layers is compared to the list of enabled layers. For example, the client available-layers module 146 compares the list of available layers (ebook-specific) to the list of enabled layers to determine a list of possible layers (i.e., layers that are both available and enabled).

In step 620, the type of the selected content is compared to the possible layers. For example, the client available-layers module 146 compares the type of the selected content (e.g., text versus image) to the possible layers (specifically, to the layers' metadata, which specifies what type of ebook content can be interacted with using each layer) to determine a list of matching layers (i.e., layers that can be used to interact with the type of the selected content).

In step 630, the matching layers are output as a list of available layers. For example, the client available-layers module 146 outputs the matching layers as a list of available layers. Note that this list of layers is selected-content-specific.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of extending functionality of an ereader module that is displaying an electronic book ("ebook"), the method comprising:

receiving, from a client device executing the ereader module, a user identifier specifying a user using the client device and an ebook identifier specifying the ebook displayed by the ereader module;

determining one or more layers associated with the user responsive to stored user layer data indicating layers that are available to the user, the layers associated with the user configured to interact with ebook content when the layers associated with the user are executed at the client device, the interaction providing additional ereader functionality responsive to identified ebook content;

determining one or more layers associated with the ebook displayed by the ereader module responsive to stored book layer data indicating layers that are available for the ebook, the layers associated with the ebook configured to interact with ebook content when the layers associated with the ebook are executed at the client device, the interaction providing additional ereader functionality responsive to identified ebook content;

assembling a list of one or more layers, the layer list based on at least one of the layers associated with the user and the layers associated with the ebook; and transmitting the layer list to the client device to enable the user to select a layer and execute the selected layer to extend the functionality of the ereader module.

2. The computer-implemented method of claim 1, wherein a layer associated with the user comprises a layer that the user has previously requested to use.

3. The computer-implemented method of claim 1, wherein a layer associated with the ebook comprises a layer on a blacklist associated with the ebook, wherein the blacklist specifies layers that are not allowed to be used with the ebook.

4. The computer-implemented method of claim 1, wherein a layer associated with the ebook comprises a layer on a whitelist associated with the ebook, wherein the whitelist specifies layers that are allowed to be used with the ebook.

5. The computer-implemented method of claim 1, wherein a layer associated with the ebook comprises a layer on an add-list associated with the ebook, wherein the add-list specifies layers that are recommended to be used with the ebook.

6. The computer-implemented method of claim 1, wherein the layer list includes layer metadata that specifies a type of ebook content that can be interacted with using a layer.

7. The computer-implemented method of claim 1, wherein the layer list includes layer metadata that specifies a display mode supported by a layer.

8. The computer-implemented method of claim 1, further comprising:
receiving, from the client device, a page range specifying a range of pages within the ebook displayed by the ereader module; and
transmitting, to the client device, layer data associated with the user, the ebook, the page range, and layers on the layer list, wherein layer data comprises an annotation that was created by a layer;
wherein the client device further enables the user to use the selected layer to view the annotation.

9. The computer-implemented method of claim 1, further comprising determining one or more layers that are enabled.

10. The computer-implemented method of claim 1, wherein the user has selected content within the ebook, and further comprising determining a type of the selected content.

11. The computer-implemented method of claim 1, further comprising transmitting to the client device a layer module that is executed by the client device responsive to the user selecting content within the ebook and indicating a layer to use to interact with the selected content.

12. The computer-implemented method of claim 11, wherein the layer module uses an application programming interface (API) provided by the client device.

13. A non-transitory computer-readable storage medium storing executable computer program instructions for extending functionality of an ereader module that is displaying an electronic book ("ebook"), the instructions performing steps comprising:

receiving, from a client device executing the ereader module, a user identifier specifying a user using the client device and an ebook identifier specifying the ebook displayed by the ereader module;

determining one or more layers associated with the user responsive to stored user layer data indicating layers that are available to the user, the layers associated with the user configured to interact with ebook content when the layers associated with the user are executed at the client device, the interaction providing additional ereader functionality responsive to identified ebook content;

determining one or more layers associated with the ebook displayed by the ereader module responsive to stored book layer data indicating layers that are available for the ebook, the layers associated with the ebook configured to interact with ebook content when the layers associated with the ebook are executed at the client device, the interaction providing additional ereader functionality responsive to identified ebook content;

assembling a list of one or more layers, the layer list based on at least one of the layers associated with the user and the layers associated with the ebook; and transmitting the layer list to the client device to enable the user to select a layer and execute the selected layer to extend the functionality of the ereader module.

14. The computer-readable storage medium of claim 13, wherein a layer associated with the user comprises a layer that the user has previously requested to use.

15. The computer-readable storage medium of claim 13, wherein a layer associated with the ebook comprises a layer on a blacklist associated with the ebook, wherein the blacklist specifies layers that are not allowed to be used with the ebook.

16. The computer-readable storage medium of claim 13, wherein a layer associated with the ebook comprises a layer on a whitelist associated with the ebook, wherein the whitelist specifies layers that are allowed to be used with the ebook.

17. The computer-readable storage medium of claim 13, wherein the layer list includes layer metadata that specifies a type of ebook content that can be interacted with using a layer.

18. The computer-readable storage medium of claim 13, wherein the steps further comprise:
receiving, from the client device, a page range specifying a range of pages within the ebook displayed by the ereader module; and
transmitting, to the client device, layer data associated with the user, the ebook, the page range, and layers on the layer list, wherein layer data comprises an annotation that was created by a layer;
wherein the client device further enables the user to use the selected layer to view the annotation.

19. The computer-readable storage medium of claim 13, wherein the steps further comprise determining one or more layers that are enabled.

20. A computer system for extending functionality of an ereader module that is displaying an electronic book ("ebook"), the computer system comprising:
at least one non-transitory computer-readable storage medium storing executable computer program instructions comprising instructions for:

receiving, from a client device executing the ereader module, a user identifier specifying a user using the client device and an ebook identifier specifying the ebook displayed by the ereader module;

determining one or more layers associated with the user responsive to stored user layer data indicating layers that are available to the user, the layers associated with the user configured to interact with ebook content when the layers associated with the user are executed at the client device, the interaction providing additional ereader functionality responsive to identified ebook content;

determining one or more layers associated with the ebook displayed by the ereader module responsive to stored book layer data indicating layers that are available for the ebook, the layers associated with the ebook configured to interact with ebook content when the layers associated with the ebook are executed at the client device, the interaction providing additional ereader functionality responsive to identified ebook content;

assembling a list of one or more layers, the layer list based on at least one of the layers associated with the user and the layers associated with the ebook; and transmitting the layer list to the client device to enable the user to select a layer and execute the selected layer to extend the functionality of the ereader module; and a processor for executing the computer program instructions.

* * * * *